United States Patent
Kim et al.

(10) Patent No.: US 10,778,134 B2
(45) Date of Patent: Sep. 15, 2020

(54) APPARATUS AND METHOD FOR CONTROLLING INVERTER FOR DRIVING MOTOR

(71) Applicants: HYUNDAI MOTOR COMPANY, Seoul (KR); KIA MOTORS CORPORATION, Seoul (KR)

(72) Inventors: Sung Kyu Kim, Bucheon-si (KR); Yong Jae Lee, Hwaseong-si (KR); Su Hyun Bae, Daegu (KR); Ho Joon Shin, Suwon-si (KR); Tae Won Ha, Suwon-si (KR); Joo Young Park, Yongin-si (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 17 days.

(21) Appl. No.: 16/209,180

(22) Filed: Dec. 4, 2018

(65) Prior Publication Data
US 2020/0028462 A1    Jan. 23, 2020

(30) Foreign Application Priority Data
Jul. 23, 2018    (KR) .......................... 10-2018-0085465

(51) Int. Cl.
*H02P 6/08*    (2016.01)
*H02P 27/08*    (2006.01)
(Continued)

(52) U.S. Cl.
CPC ........ *H02P 27/085* (2013.01); *H02M 7/5395* (2013.01); *H02P 23/14* (2013.01); *H02P 2209/13* (2013.01)

(58) Field of Classification Search
CPC ...... H02P 21/0017; H02P 21/05; H02P 21/16; H02P 21/18; H02P 21/22; H02P 27/085; H02P 27/12; H03K 3/017
See application file for complete search history.

(56) References Cited

U.S. PATENT DOCUMENTS 6,107,776 A  *  8/2000  Nakazawa  .............. H02P 27/08
                                                   318/254.2
6,600,669 B2 *  7/2003  Trzynadlowski ... H02M 7/5395
                                                   363/132
(Continued)

FOREIGN PATENT DOCUMENTS

JP       2014-018052 A    1/2014
JP         5577799 B2     8/2014
(Continued)

*Primary Examiner* — Muhammad S Islam
(74) *Attorney, Agent, or Firm* — Morgan, Lewis & Bockius LLP

(57) ABSTRACT

An apparatus for controlling an inverter for driving a motor includes a processor which includes: a current processor for generating a voltage command for causing a current detection value obtained by measuring a current supplied from the inverter to the motor to follow a current command for driving the motor; a voltage modulator for generating a pulse width modulation signal for controlling on and off states of switching elements in the inverter with a predetermined switching frequency based on the voltage command; and a frequency determining processor for setting a frequency change range within which the switching frequency will be randomly changed and randomly determining the switching frequency within the frequency change range when a random pulse width modulation method is applied to control of the inverter.

16 Claims, 11 Drawing Sheets

(51) Int. Cl.
*H02P 23/14* (2006.01)
*H02M 7/5395* (2006.01)

(56) References Cited

U.S. PATENT DOCUMENTS

| | | | |
|---|---|---|---|
| 9,479,095 B2 | 10/2016 | Sankaran | |
| 2006/0050831 A1* | 3/2006 | Schulz | H02M 7/53873 375/377 |
| 2012/0217913 A1* | 8/2012 | Wu | H02P 21/16 318/400.04 |
| 2012/0268050 A1* | 10/2012 | Liu | H02P 21/0007 318/400.34 |
| 2012/0286716 A1* | 11/2012 | Ohsugi | H02P 27/08 318/494 |
| 2013/0169206 A1* | 7/2013 | Suhama | H02P 27/085 318/400.24 |
| 2013/0317630 A1* | 11/2013 | Schulz | H02P 23/04 700/73 |
| 2015/0288306 A1* | 10/2015 | Wu | H02P 21/0007 318/400.32 |
| 2017/0085199 A1* | 3/2017 | Campbell | H02P 27/06 |
| 2018/0302013 A1* | 10/2018 | Nakano | H02P 21/0089 |

FOREIGN PATENT DOCUMENTS

| | | |
|---|---|---|
| KR | 2001-0073638 A | 8/2001 |
| KR | 10-2010-0062638 A | 6/2010 |
| KR | 10-2016-0007850 A | 1/2016 |

\* cited by examiner

Application of 12-sample phase control
(base frequency change)

APPARATUS AND METHOD FOR CONTROLLING INVERTER FOR DRIVING MOTOR

CROSS REFERENCE TO RELATED APPLICATION

The present application claims priority of Korean Patent Application No. 10-2018-0085465 filed on Jul. 23, 2018, the entire contents of which is incorporated herein for all purposes by this reference.

TECHNICAL FIELD

The present disclosure relates to an apparatus for controlling an inverter for driving a motor, and more specifically, to an apparatus and a method for controlling an inverter for driving a motor, capable of setting a frequency change range which is randomly determined when application of random pulse width modulation for randomly changing a pulse width modulation frequency of an inverter for providing driving power to a motor starts or stops.

BACKGROUND

In general, a system for driving a motor may include a power storage device (e.g., battery), an inverter for converting DC power stored in the power storage device into 3-phase AC power for driving a motor, the motor, a controller for controlling switching of the inverter on the basis of a current command generated on the basis of a torque command for driving the motor and a measured current actually provided to the motor.

Here, the inverter includes a plurality of switching elements, and these switching elements may be controlled according to pulse width modulation (PWM) to generate AC power. The AC power generated through the inverter is provided to the motor such that the motor is driven.

When a pulse width modulation signal for controlling the switching elements in the inverter has a fixed frequency, control is simplified to improve controllability and to achieve stabilized control of a motor driving system. On the other hand, when the inverter is controlled according to the pulse width modulation signal at a fixed frequency, strong harmonic components appear in a band corresponding to an integer multiple of the switching frequency, causing electromagnetic noise and vibration.

To solve the disadvantage caused by the pulse width modulation signal having a fixed switching frequency, a random pulse width modulation (RPWM) method which instantaneously disperses a switching frequency band is known. When the RPWM method is applied, noise or vibration can be suppressed through energy distribution but controllability deteriorates because a switching frequency randomly changes. Further, when the RPWM method and other modulation methods applied to a 6-step control technique using 12-sample phase control are switched each other, the switching frequency rapidly changes, deteriorating current controllability of an inverter.

The details described above as background art are for providing a thorough understanding of the present disclosure, and it will be apparent to those skilled in the art that the present disclosure may be practiced without such specific details.

SUMMARY

An object of the present disclosure is to provide an apparatus and a method for controlling an inverter for driving a motor, which can set a frequency change range which is randomly determined when application of random pulse width modulation for randomly changing a pulse width modulation frequency of an inverter for providing driving power to a motor starts or stops such that the frequency change range gradually increases or decreases, to thereby prevent current controllability deterioration caused by abrupt switching of pulse width modulation methods as well as reducing inverter switching noise.

According to an exemplary embodiment of the present disclosure, an apparatus for controlling an inverter for driving a motor includes: a current controller for generating a voltage command for causing a current detection value obtained by measuring a current supplied from the inverter to the motor to follow a current command for driving the motor; a voltage modulator for generating a pulse width modulation signal for controlling on/off states of switching elements in the inverter with a predetermined switching frequency on the basis of the voltage command; and a frequency determining processor for setting a frequency change range which is a range within which the switching frequency is randomly changed and randomly determining the switching frequency within the frequency change range when a random pulse width modulation method is applied to control of the inverter, wherein the frequency determining processor applies the random pulse width modulation method or stops application of the random pulse width modulation method by gradually increasing or decreasing the frequency change range.

The frequency determining processor may gradually increase or decrease the frequency change range when the random pulse width modulation method and another modulation method applied to control of the inverter are switched.

The frequency determining processor may set a maximum value of the frequency change range, gradually change the frequency change range from the maximum value to 0 when the random pulse width modulation method is switched to a modulation method other than the random pulse width modulation method while the inverter is controlled according to the random pulse width modulation method, and gradually change the frequency change range from 0 to the maximum value when a modulation method other than the random pulse width modulation method is switched to the random pulse width modulation method while the inverter is controlled according to the modulation method other than the random pulse width modulation method.

The frequency determining processor may directly change the frequency change range to 0 to start an emergency operation when a fault signal is generated while the inverter is controlled according to the random pulse width modulation method and directly change the frequency change range from 0 to a frequency change range before generation of the fault when a fault cancellation signal is generated during the emergency operation.

The frequency determining processor may include: a random band generator for determining the frequency change range; a random number generator for randomly determining a constant within a preset range; a base frequency generator for generating a base frequency which is a base for determining the switching frequency; and an adder for adding values obtained by multiplying the base frequency by the frequency change range determined by the random band generator and the constant generated by the random number generator to determine the switching frequency, wherein the random band generator may set a maximum value of the frequency change range, gradually change the frequency change range from the maximum value to 0 when the random pulse width modulation method is switched to a modulation method other than the random pulse width modulation method while the inverter is controlled according to the random pulse width modulation method, and gradually change the frequency change range from 0 to the maximum value when a modulation method other than the random pulse width modulation method is switched to the random pulse width modulation method while the inverter is controlled according to the modulation method other than the random pulse width modulation method.

The frequency determining processor may set a maximum value of the frequency change range on the basis of motor driving information including the current command, the current detection value, the temperature of the inverter, the temperature of the motor and a speed of the motor.

The random band generator may randomly determine a constant in a range of −1 to 1.

The voltage modulator may generate a carrier signal in the form of triangular waves having a frequency corresponding to the switching frequency and comparing the voltage command with the carrier signal to generate the pulse width modulation signal in the form of square waves.

According to an exemplary embodiment of the present disclosure, a method for controlling an inverter for driving a motor through a random pulse width modulation method for randomly changing a frequency of a pulse width modulation signal includes: generating a base frequency which is a base for determining a switching frequency of the pulse width modulation signal for controlling switching of switching elements in the inverter; setting a frequency change range for changing the switching frequency and gradually increasing/decreasing the frequency change range according to whether application of the random pulse width modulation method is started or stopped; randomly determining a constant within preset range; and determining the switching frequency by adding values obtained by multiplying the base frequency by the frequency change range and the constant.

In one embodiment of the present disclosure, the increasing/decreasing may include: determining a maximum value of the frequency change range for changing the switching frequency; and gradually increasing the frequency change range from 0 to the maximum value or gradually decreasing the frequency change range from the maximum value to 0 according to whether application of the random pulse width modulation method is started or stopped.

The decreasing may include gradually changing the frequency change range from the maximum value to 0 when the random pulse width modulation method is switched to a modulation method other than the random pulse width modulation method while the inverter is controlled according to the random pulse width modulation method, and gradually changing the frequency change range from 0 to the maximum value when a modulation method other than the random pulse width modulation method is switched to the random pulse width modulation method while the inverter is controlled according to the modulation method other than the random pulse width modulation method.

The determining of the maximum value may include determining the maximum number on the basis of motor driving information including a current command, a current detection value, the temperature of the inverter, the temperature of the motor and a speed of the motor.

The method may further include directly changing the frequency change range to 0 to start an emergency operation when a fault signal is generated while the inverter is controlled according to the random pulse width modulation method and directly changing the frequency change range from 0 to a frequency change range before generation of the fault when a fault cancellation signal is generated during the emergency operation.

The method may further include generating a carrier signal in the form of triangular waves having a frequency corresponding to the switching frequency determined in the determining and comparing the carrier signal with a voltage command determined to cause a current detection value obtained by measuring a current supplied from the inverter to the motor to follow a current command to generate the pulse width modulation signal in the form of square waves.

The determining of the constant may include randomly determining the constant within a range of −1 to 1.

According to the above-described apparatus and method for controlling an inverter for driving a motor, it is possible to prevent abrupt changes in the frequency of the pulse width modulation signal and deterioration of current controllability of the inverter by continuously and gradually changing the frequency change range, which is a range within which the frequency is randomly determined when modulation methods switch between the random pulse width modulation method and other modulation methods.

In addition, according to the above-described apparatus and method for controlling an inverter for driving a motor, in a situation in which a fault is generated in a motor system or a fault is canceled, it is possible to rapidly cope with the fault in the motor system by immediately changing the frequency change range at the time when the situation occurs.

BRIEF DESCRIPTION OF THE DRAWINGS

FIG. 11A is a diagram showing a case in which the frequency change range is set to a maximum frequency change range when the fault is canceled, and FIG. 11B is a diagram showing a case in which the frequency change range is set to 0 when the fault is generated.

DETAILED DESCRIPTION

Hereinafter, an apparatus and a method for controlling an inverter for driving a motor according to various embodiments will be described with reference to the attached drawings.

Figure 1:
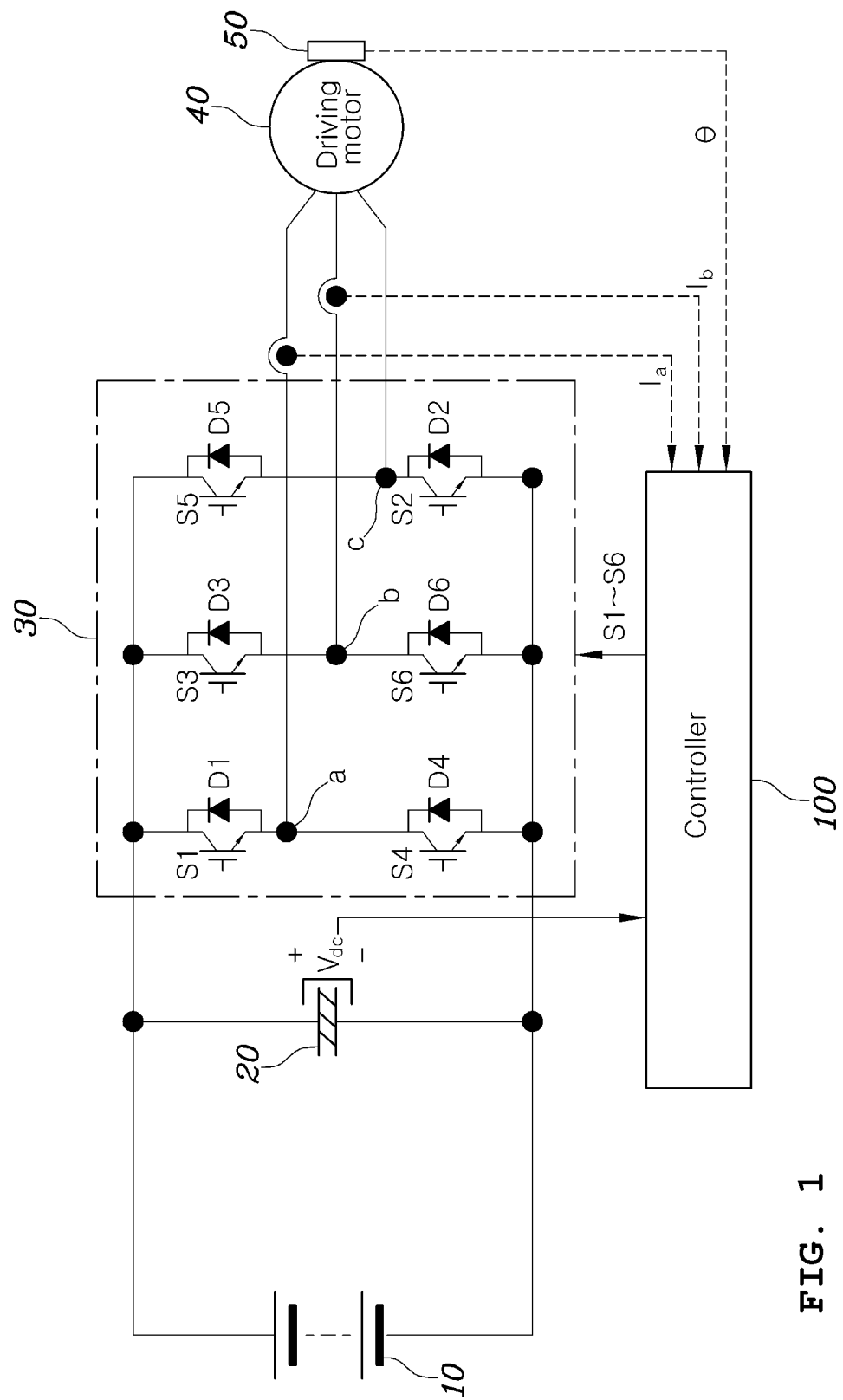
FIG. 1 is a circuit diagram of a motor driving system to which an apparatus and a method for controlling an inverter for driving a motor according to an embodiment of the present disclosure are applied.

FIG. 1 is a circuit diagram of a motor driving system to which an apparatus for controlling an inverter for driving a motor according to an embodiment of the present disclosure is applied.

Referring to FIG. 1, the motor driving system to which the apparatus for controlling an inverter for driving a motor according to an embodiment of the present disclosure is applied may include an energy storage device 10, a DC link capacitor 20 connected between both ends of the energy storage device, an inverter 30, a motor 40, a rotation angle sensor 50 and a controller 100.

The energy storage device 10 is an element which stores electric energy for driving the motor 40 in the form of DC power, such as a battery, and outputs DC power.

The DC link capacitor 20 is connected between both ends of the energy storage device 10 and generates a DC link voltage Vdc according to charging. The DC link voltage Vdc serves as an input voltage of the inverter 30.

The inverter 30 is an element for converting DC power stored in and provided by the energy storage device 10 into AC power for driving the motor and may include a plurality of switching elements S1 to S6, on/off states of which are controlled by a pulse width modulation signal provided by the controller 100. Switching of the inverter 30 may be understood as switching of a three-phase voltage output from the inverter.

The motor 40 is an element which is provided with three-phase AC power supplied from the inverter 30 to generate torque, and various types of motors known in the art may be employed. In a green vehicle, a motor which provides torque to wheels of the vehicle may be referred to as a driving motor.

The rotation angle sensor 50 is an element which detects a position of a motor rotor, that is, a rotation angle of the motor rotor, and may detect the angle of the rotor of the motor 40 and continuously output rotation angle detection signals including information about the detected rotation angle of the rotor. For example, the rotation angle sensor 40 may be realized as a resolver.

The controller 100 may basically perform control according to pulse width modulation which appropriately adjusts a duty cycle (duty ratio) of the switching elements S1 to S6 of the inverter 30 in order to control the torque of the motor 40 to a desired value (torque command). For such control, the controller 100 derives torque related information on the motor 40 being driven on the basis of a signal provided by the rotation angle sensor 50 and values $I_a$ and $I_b$ obtained by detecting current provided to the motor 40. Subsequently, the controller 100 controls the switching elements S1 to S6 in the inverter 30 on the basis of a result of comparison between a torque command value (torque target value desired to be acquired through the motor 40) with respect to the motor 40, input from the outside, and the torque related information on the motor 40 being driven such that the motor 40 can output a value corresponding to the torque command value.

In an embodiment of the present disclosure, the controller 100 generates a pulse width modulation signal using random pulse width modulation (RPWM) which randomly determines a frequency of a pulse width modulation signal for controlling on/off of the switching elements S1 to S6 in the inverter 30. Particularly, the controller 100 appropriately determines a range of changes of the frequency of the pulse width modulation signal using various types of motor driving information to decrease switching noise caused by frequency concentration while minimizing reduction in controllability and efficiency of the motor due to application of random pulse width modulation.

In the present disclosure, the current controller 100 may be a processor for operating and controlling by a predetermined program, the signal generator 200 may be an electronic device that generates repeating or non-repeating electronic signals in either the analog or the digital domain.

In the system shown in FIG. 1, the controller 100 may be an apparatus for controlling an inverter according to the present disclosure and a method of controlling the inverter performed by the controller 100 may be a method for controlling an inverter according to the present disclosure.

Figure 2:
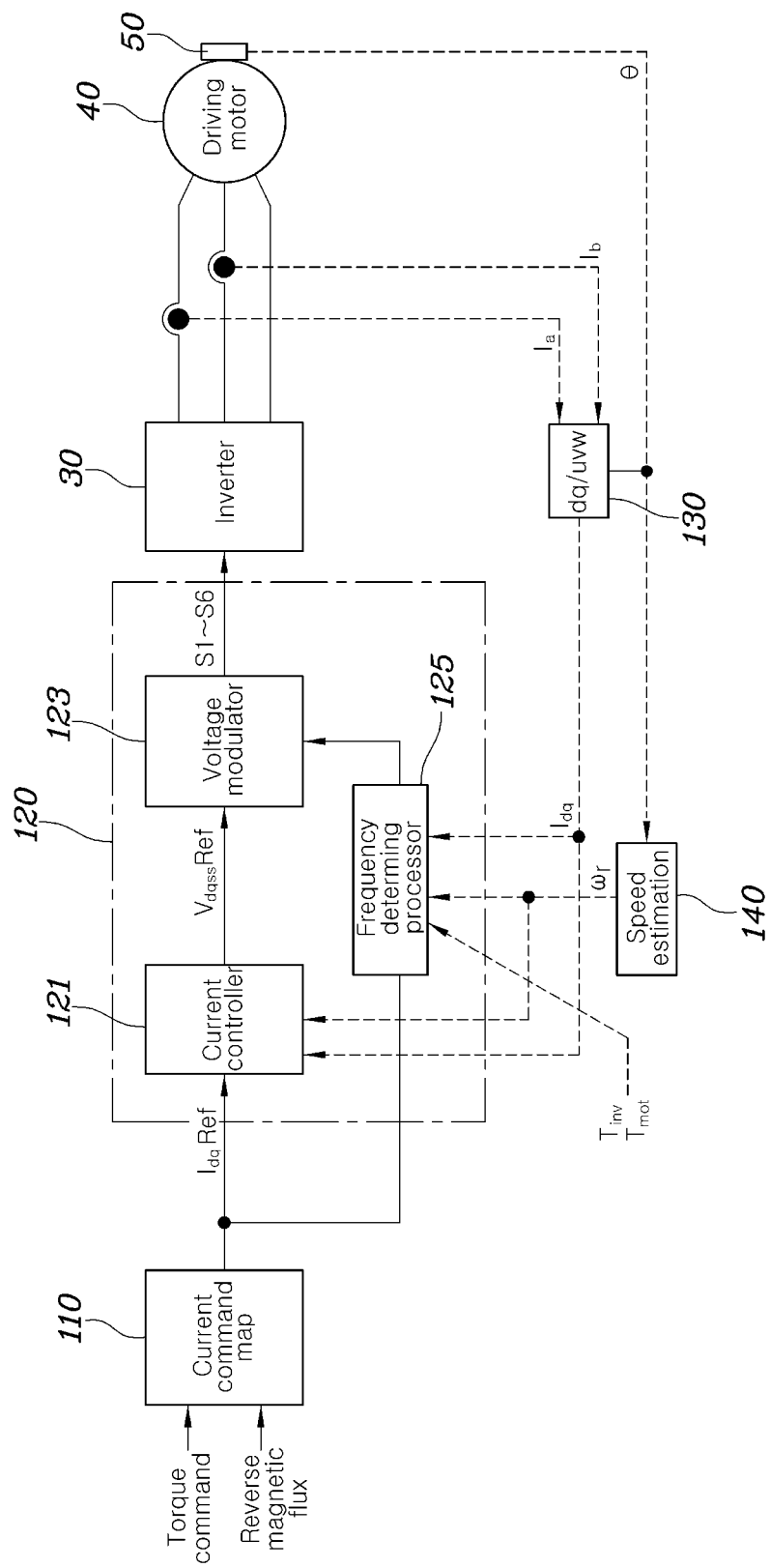
FIG. 2 is a block diagram showing the apparatus for controlling an inverter for driving a motor according to an embodiment of the present disclosure in detail.

FIG. 2 is a block diagram showing the apparatus for controlling an inverter for driving a motor according to an embodiment of the present disclosure in more detail and illustrates the detailed configuration of the controller 100 and a system composed of the inverter 30 controlled by the controller 100 and the motor 40 driven by a three-phase voltage received from the inverter 30.

Referring to FIG. 2, the apparatus for controlling an inverter for driving a motor according to an embodiment of the present disclosure (the controller 100 of FIG. 1) may include a current command map 110 which receives a torque command and a reverse magnetic flux of the motor input from the outside and outputs a current command $I_{dp}$Ref of the motor corresponding to the torque command and the reverse magnetic flux, a current control task processor 120 which compares the current command $I_{dp}$Ref with a current detection value obtained by detecting a current provided to the motor 40 to generate a voltage command $V_{dpss}$Ref for causing the current detection value to follow the current command $I_{dp}$Ref and generates a gate signal for controlling on/off of the switching elements S1 to S6 through pulse width modulation such that an output of the inverter 30 corresponding to the voltage command $V_{dpss}$Ref is generated, a coordinate converter 130 which converts a value obtained by detecting phase current $I_a$ and $I_b$ provided to the motor 40 into d/q axis current $I_{dp}$, and a speed estimator 140 which derives a rotation speed of the motor 40 using the position of the motor rotor detected by the rotation angle sensor 50.

The current command map 110 may previously store the current command $I_{dp}$Ref simultaneously mapped to a torque command for the motor 40 and the reverse magnetic flux of the motor 40. Accordingly, the current command map 110 receives a torque command of the motor input from an external upper controller or the like and a value obtained by detecting the reverse magnetic flux output from the motor and outputs the current command $I_{dp}$Ref corresponding thereto. The current command $I_{dp}$Ref may have a form of d/q axis current command in a rest frame.

Although the current command map 110 receives the torque command for the motor 40 and the reverse magnetic flux of the motor 40 as inputs and outputs the current command $I_{dp}$Ref mapped to the two values in the embodiments shown in FIG. 2, this is merely an example and the current command map 110 may output a current command using a map in which current commands are mapped to input values in other forms. Further, the current command map 110 is merely an example of a method applicable to generate current and a current command may be derived using methods other than the map, for example, by inputting a specific input value to a preset mathematical expression, for example.

The current control task processor 120 may include a current controller 121, a voltage modulator 123, and a frequency determining processor 125.

The current controller 121 may receive the d/q axis current command $I_{dp}$Ref from the current command map 110, receive the current detection value $I_a$ and $I_b$ obtained by measuring current provided to the motor from the coordinate converter 130 and receive an estimated rotation speed (rotation frequency) $\omega_r$ of the motor from the speed estimator 140. The current controller 121 may generate the voltage command $V_{dpss}$Ref using the received information.

Here, the speed estimator 140 may be include control logics

More specifically, the current controller 121 may generate the voltage command $V_{dpss}$Ref using a difference component between the d/q axis current command $I_{dp}$Ref output from the current command map 110 and a measured d/q axis current $I_{dp}$. Particularly, the current controller 121 may be realized in the form of a proportional integral (PI) controller and proportionally integrating the difference component between the d/q axis current command $I_{dp}$Ref and the measured d/q axis current $I_{dp}$ to generate a d/1 axis voltage command $V_{dqss}$Ref for causing the measured d/q axis current to follow the current command $I_{dp}$Ref.

The voltage modulator 123 receives the voltage command $V_{dqss}$Ref and a switching frequency (or carrier frequency) generated by the frequency determining processor 125 and generates a pulse width modulation signal for determining on/off states of the switching elements in the inverter 30 on the basis of the voltage command $V_{dqss}$Ref and the switching frequency. For example, the voltage modulator 123 may generate a carrier signal in the form of triangular waves in accordance with the switching frequency (carrier frequency) determined by the frequency determining processor 125 and generate a pulse width modulation signal in the form of square waves by comparing the carrier signal with the d/q axis voltage command $V_{dqss}$Ref.

In the present disclosure, each of the current controller 121, the voltage modulator 123, and frequency determining processor 125 may be implemented as a processor such as a central processing unit (CPU) in an electronic circuitry within a computer that carries out instructions of a computer program by performing arithmetic, logical, control, and input/output (I/O) operations specified by the instruction.

Further, the current control task processor 120 including the current controller 121, the voltage modulator 123, and the frequency determining processor 125 may be embedded in the controller 100 as one controller.

The pulse width modulation signal output from the voltage modulator 123 may be provided to gates of the switching elements S1 to S6 in the inverter 30 to determine on/off of the switching elements S1 to S6, and thus a three-phase AC voltage (three-phase AC) supplied from the inverter 30 to the motor 40 may be determined.

The frequency determining processor 125 is an element which determines a switching frequency of the inverter 30 and may randomly determine the switching frequency within a preset range and provide the switching frequency to the voltage modulator 123. Particularly, the frequency determining processor 125 may receive information related to driving of the motor 40, determine a range of changes of a switching frequency on the basis of the information and determine a switching frequency randomly changing within the determined change range.

Figure 3:
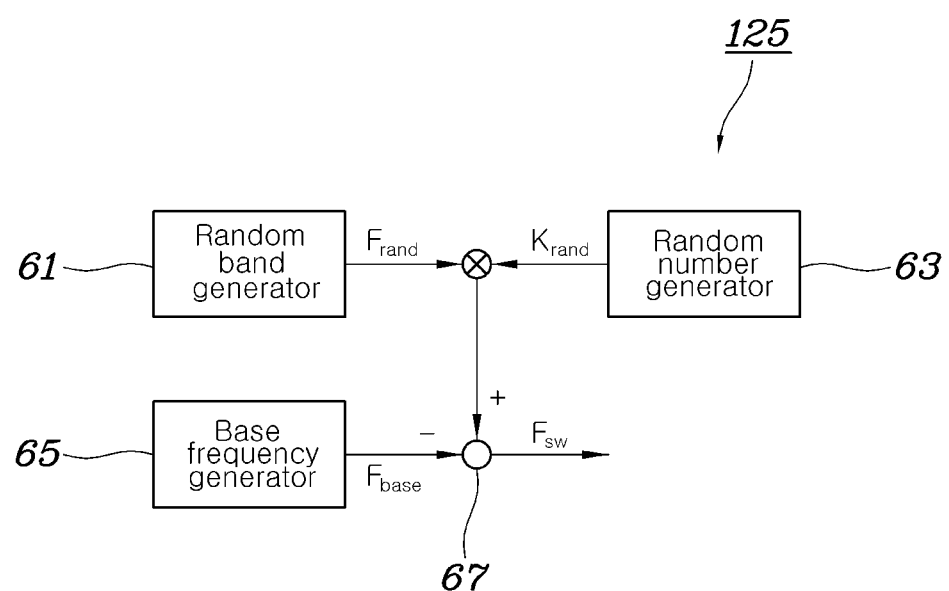
FIG. 3 is a block diagram showing a frequency determining processor of the apparatus for controlling an inverter for driving a motor according to an embodiment of the present disclosure in detail.

FIG. 3 is a block diagram showing the frequency determining processor of the apparatus for controlling an inverter for driving a motor according to an embodiment of the present disclosure in more detail.

Referring to FIG. 3, the frequency determining processor 125 may include a random band generator 61 which determines a range $F_{rand}$ of changes of a switching frequency for changing the frequency of the pulse width modulation signal, a random number generator 63 which determines a random number $K_{rand}$ which is a random constant within the range of −1 to 1 multiplied by the switching frequency change range $F_{rand}$ determined by the random band generator 61, a base frequency generator 65 which generates a base frequency $F_{base}$ which is a base of the switching frequency, and an adder 67 which adds a frequency determined by multiplying the frequency change range $F_{rand}$ by the random number $K_{rand}$ to the base frequency base to determine a switching frequency $F_{sw}$.

The frequency determining processor 125 determines the randomly changing switching frequency $F_{sw}$ by adding a random frequency change value to the base frequency $F_{base}$ determined by the base frequency generator 65. The base frequency generator 65 may determine a base switching frequency using a switching frequency determination method applied to other pulse width modulation techniques for generating a pulse width modulation signal at a fixed switching frequency.

Here, the random frequency change value changes within a predetermined change range. To this end, the random band generator 61 sets the frequency change range $F_{rand}$ and multiplies the set frequency change range $F_{rand}$ by the random number $K_{rand}$ having a value in the range of −1 to 1 to randomly determine the frequency change value within the frequency change range.

The switching frequency $F_{sw}$ determined by adding the frequency change value $K_{rand} \times F_{rand}$ to the base frequency $F_{base}$ by means of the adder 67 is provided to the voltage modulator 123, and the voltage modulator generates a pulse width modulation signal having a frequency corresponding to the switching frequency $F_{sw}$ (corresponding to a carrier frequency). As described above, the voltage modulator 123 may generate a carrier signal in the form of triangular waves in accordance with the switching frequency $F_{sw}$ (carrier frequency) determined by the frequency determining processor 125 and generate a pulse width modulation signal in the form of square waves by comparing the carrier signal with the d/q axis voltage command $V_{dqss}$Ref.

According to an embodiment of the present disclosure, the frequency change range may be determined using at least some of various types of motor driving information such as a motor driving environment and a control state. That is, the random band generator 61 may receive motor driving information and determine a frequency on the basis of the motor driving information.

Figure 4:
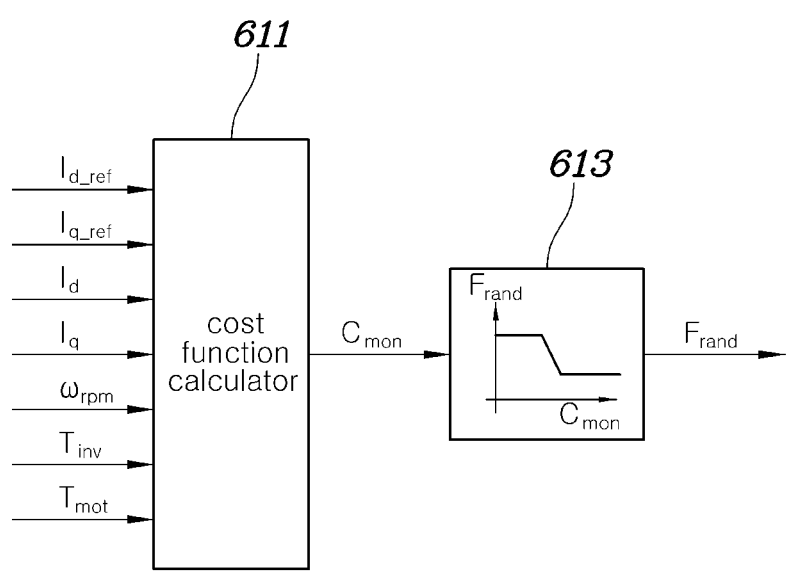
FIGS. 4 and 5 are block diagrams showing a random band generation unit for determining a frequency change range in the apparatus for controlling an inverter for driving a motor according to an embodiment of the present disclosure in detail.
Figure 5:
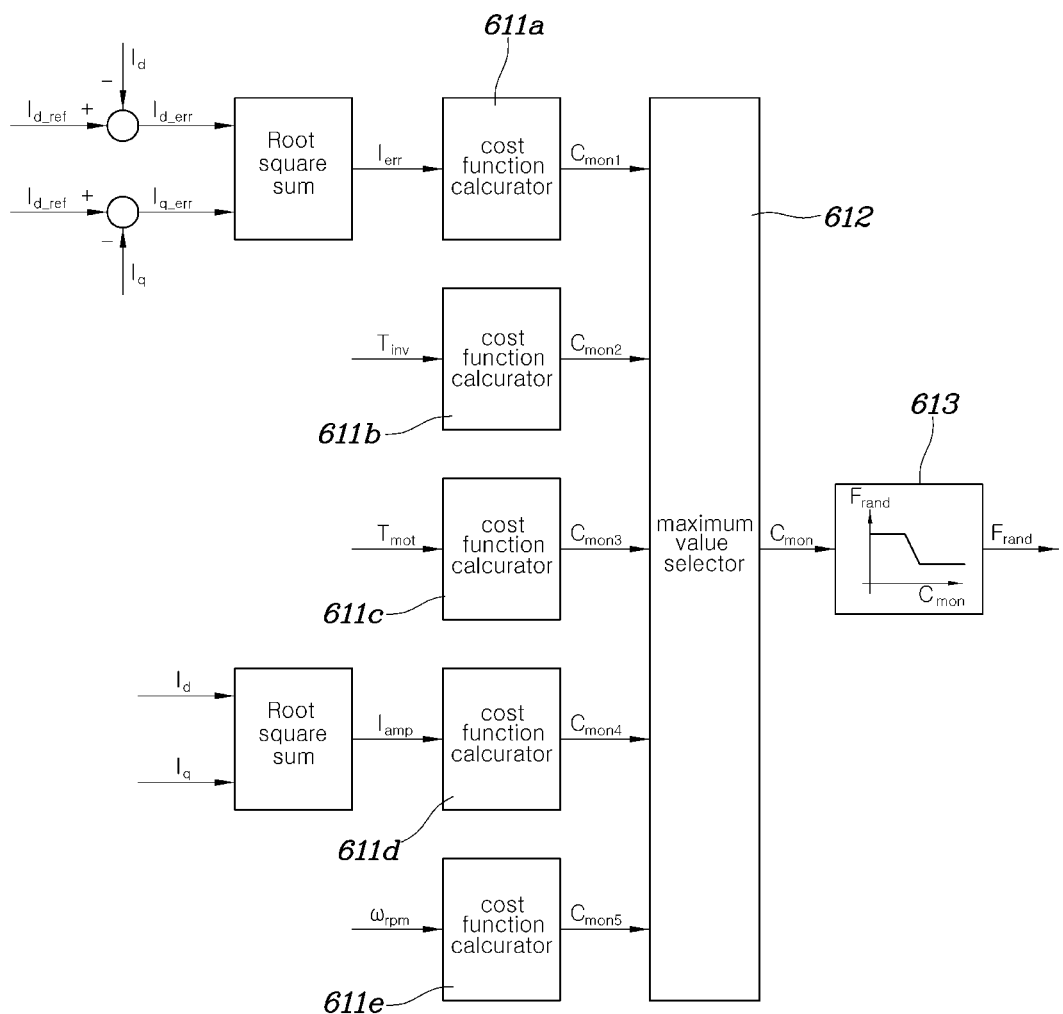

FIGS. 4 and 5 are block diagrams showing various examples of the random band generator which determines a frequency change range in the apparatus for controlling an inverter for driving a motor according to an embodiment of the present disclosure.

Referring to FIG. 4, the random band generator 61 may include a cost function calculator 611 which receives various types of motor driving information and generates a cost value $C_{mon}$ which is a base for determining the frequency change range $F_{rand}$ using a cost function having each piece of the received motor driving information as a variable, and a data map 613 which previously stores frequency change ranges $F_{rand}$ mapped to cost values $C_{mon}$ and outputs the frequency change range $F_{rand}$ mapped to the cost value $C_{mon}$ calculated by and input from the cost function calculator 611.

Motor driving information input to the cost function calculator 611 may include d/q current commands $I_{d\_ref}$ and $I_{g\_ref}$ corresponding to a torque command for driving the motor, current detection values $I_d$ and $I_q$ obtained by detecting current supplied from the inverter 30 to the motor 40, a rotation speed $\omega_{rpm}$ of the motor 40, the temperature $T_{inv}$ of the inverter 30, the temperature $T_{mot}$ of the motor 40, and the like.

The cost function calculator 611 may calculate a cost function for generating a reference value (cost value) for determining an appropriate switching frequency change range $F_{rand}$ using received various types of motor driving information. The cost function is a formula having input motor driving information as a variable, and a weight may be added to the cost function per motor driving information type as necessary.

The data map 613 may previously store frequency change ranges $F_{rand}$ mapped to cost values $C_{mon}$ and output a frequency change range $F_{rand}$ mapped to a cost value $C_{mon}$ when the cost value $C_{mon}$ is input. In the data map 613, a limit value may be set for the frequency change ranges $F_{rand}$ with respect to a very low cost value or a very high cost value. That is, a maximum value and a minimum value may be preset for the frequency change ranges $F_{rand}$ and a frequency change range may be appropriately determined according to a cost value in the range of the maximum value to the minimum value. Here, the maximum value of the frequency change ranges $F_{rand}$ may be a value by which a maximum switching frequency capable of stably controlling the motor 40 can be generated and the minimum value of the frequency change ranges $F_{rand}$ may be 0 which corresponds to a case in which the switching frequency is set to a base frequency and is not changed.

Referring to FIG. 5 in which another example of the random band generator 61 is shown, the random band generator 61 may include: multiple cost function calculators 611a to 611e which individually calculate cost functions for motor driving information such as d/q current commands $I_{d\_ref}$ and d/q current detection values $I_d$ and $I_q$ obtained by detecting current supplied from the inverter 30 to the motor 40, a rotation speed $\omega_{rpm}$ of the motor 40, the temperature $T_{inv}$ of the inverter 30, and the temperature $T_{mot}$ of the motor 40; a maximum value selector 612 which selects a maximum value among cost values $C_{mon1}$ to $C_{mon5}$ calculated by the cost function calculators 611a to 611e; and a data map 613 which previously stores frequency change ranges $F_{rand}$ mapped to cost values $C_{mon}$, receives a cost value selected by the maximum value selector 612 and outputs a frequency change range $F_{rand}$ corresponding to the received cost value.

In the example shown in FIG. 5, the cost function calculators 611a to 611e may be individually applied to values calculated using a plurality of pieces of input motor driving information or some thereof to calculate a plurality of cost values and then a frequency change range $F_{rand}$ for a maximum value among the calculated cost values $C_{mon1}$ to $C_{mon5}$ may be determined, distinguished from the example shown in FIG. 4.

For example, the first cost function calculator 611a may calculate a cost value using a cost function having the average value $I_{err}$ of differences between d/q current commands $I_{d\_ref}$ and $I_{g\_ref}$ and d/q current detection values $I_d$ and $I_q$ obtained by detecting current supplied from the inverter 30 to the motor 40 as variables. The second cost function calculator 611b may calculate a cost value using a cost function having the temperature $T_{inv}$ of the inverter as a variable, and the third cost function calculator 611c may calculate a cost value using a cost function having the temperature $T_{mot}$ of the motor as a variable. In addition, the fourth cost function calculator 611d may calculate a cost value using a cost function having the average $I_{amp}$ of d/q current detection values as a variable and the fifth cost function calculator 611e may calculate a cost value using a cost function having the rotation speed $\omega_{rpm}$ of the motor 40 as a variable.

The maximum value selector 612 may select a maximum value among the cost values $C_{mon1}$ to $C_{mon5}$ such that a switching frequency change range can be determined in consideration of information most affected by random change of a switching frequency among the cost values calculated as described above, and the data map 613 may determine a frequency change range $F_{rand}$ using a cost value corresponding to the maximum value as an input.

In FIGS. 4 and 5, a cost function may output a larger cost value as input motor driving information is more likely to represent a state in which controllability deteriorates, and the data map 613 may perform data mapping such that frequency change ranges $F_{rand}$ decrease as input cost values increase. For example, when the average value $I_{err}$ of differences between d/q current commands $I_{d\_ref}$ and $I_{g\_ref}$ and d/q current detection values $I_d$ and $I_q$ obtained by detecting current supplied from the inverter 30 to the motor 40 increases, the motor may not appear to be appropriately controlled. In this case, a cost value increases as the average value $I_{err}$ increases and a frequency change range output from the data map may decrease. That is, an embodiment of the present disclosure can improve controllability while reducing a frequency change range to decrease noise reduction effect under conditions in which controllability improvement is required. Examples of driving information with deteriorated controllability may include increase in the inverter temperature $T_{inv}$, increase in the motor temperature $T_{mot}$, increase in the average $I_{amp}$ of d/q current detection values, increase in the motor rotation speed $\omega_{rpm}$, and the like. A cost value increases as controllability decreases according to driving information and thus a frequency change range $F_{rand}$ may decrease.

A frequency change value is determined by multiplying a frequency change range $F_{rand}$ determined by the random band generator 61 which may be realized as the example shown in FIG. 4 or 5 by a random number $K_{rand}$ within a range of −1 to 1 generated by the random number generator 63, and a switching frequency $F_{sw}$ is determined by adding the frequency change value to the base frequency $F_{base}$ generated by the base frequency generator 65.

The present disclosure also provides a method for controlling an inverter using the above-described apparatus for controlling an inverter for driving a motor.

Figure 6:
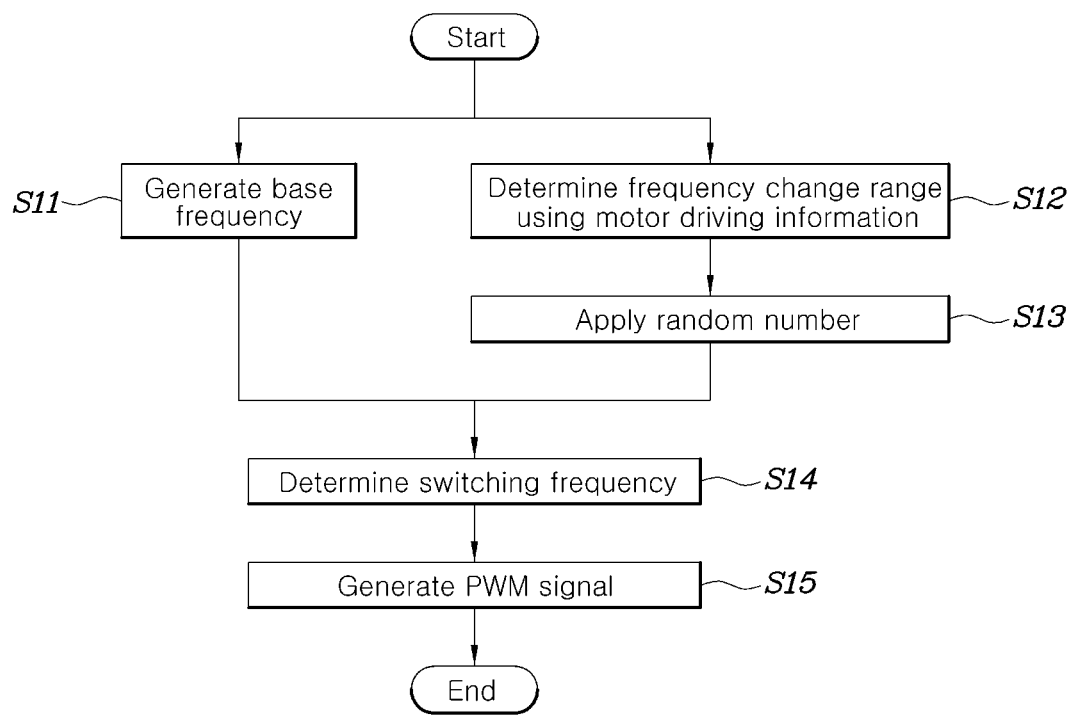
FIG. 6 is a flowchart of a method for controlling an inverter for driving a motor according to an embodiment of the present disclosure.

FIG. 6 is a flowchart of a method for controlling an inverter for driving a motor according to an embodiment of the present disclosure.

Referring to FIG. 6, the method for controlling an inverter for driving a motor according to an embodiment of the present disclosure may start with step S11 in which the base frequency generator 65 generates a base frequency $F_{base}$ for switching the inverter 30 and step S12 in which the random band generator 61 receives motor driving information and determines a frequency change range $F_{rand}$. Normal inverter control, for example, control of generating a current command on the basis of a torque command of the motor 40 input from the outside and comparing the current command with a current detection value obtained by detecting actual current provided to the motor 40 to generate a voltage command, and the like, may be immediately performed when the motor starts to operate.

In step S11 of generating the base frequency $F_{base}$, the base frequency may be generated using a method applied to pulse width modulation using a fixed switching frequency other than random pulse width modulation.

In addition, in step S12, a method of generating a cost value using all of a plurality of pieces of motor driving information as variables and then determining a frequency change range $F_{rand}$ corresponding to the cost value using a data map and a method of generating cost values with respect to a plurality of pieces of motor driving information and determining a frequency change range $F_{rand}$ on the basis of a maximum value among a plurality of pieces of cost values may be selectively applied, as described above with reference to FIGS. 4 and 5.

Further, the random generator 63 may generate a random number $K_{rand}$ having a random value in the range of −1 to 1 in parallel with steps S11 and S12, and a frequency change value may be determined by multiplying the frequency change range $F_{rand}$ by the random number $K_{rand}$ in step S13.

Subsequently, the adder 67 determines a switching frequency $F_{sw}$ of a pulse width modulation signal for controlling the inverter 30 by adding the frequency change value to the base frequency $F_{base}$ and provides the switching frequency $F_{sw}$ to the voltage modulator 123 (S14).

Then, the voltage modulator 123 receives a voltage command $V_{dqss}Ref$ and the switching frequency $F_{sw}$ (or carrier frequency) generated in the adder 67 and generates a pulse width modulation signal for determining on/off states of the switching elements in the inverter 30 on the basis of the voltage command $V_{dqss}Ref$ and the switching frequency $F_{sw}$ (S15). As described above, the voltage modulator 123 may generate a carrier signal in the form of triangular waves corresponding to the switching frequency $F_{sw}$ (or carrier frequency) generated in the adder 67 and generate a pulse width modulation signal in the form of square waves by comparing the carrier signal with the d/q axis voltage command $V_{dqss}Ref$ in step S15.

The pulse width modulation signal generated in the voltage modulator 123 may be provided to the gates of the switching elements S1 to S6 in the inverter 30 to control on/off states of the switching elements S1 to S6.

Since the control flow as shown in FIG. 6 is continuously repeated while the motor is driven, a switching frequency may be randomly determined whenever the control flow is repeated.

As described above, the apparatus and method for controlling an inverter for driving a motor according to embodiments of the present disclosure can prevent generation of large harmonic components at a specific frequency by randomly changing the switching frequency of the inverter, to thereby considerably reduce switching noise and the like.

Particularly, the apparatus and method for controlling an inverter for driving a motor according to embodiments of the present disclosure receive various types of motor driving information and determine a switching frequency change range which affects controllability and thus can maintain appropriate controllability even in a state in which motor controllability deteriorates (e.g., a state in which a difference between a motor current command and an actual current provided to the motor is large or the temperature of the motor or the inverter has excessively increased).

According to another embodiment of the present disclosure, a frequency change range which is randomly determined when application of the aforementioned random pulse width modulation method is started or stopped may be set such that the frequency change range gradually increases or decreases for a predetermined time.

To this end, in another embodiment of the present disclosure, application of the random pulse width modulation method may be started or stopped in such a manner that, after the random band generator 61 determines a frequency change range, a frequency change range is gradually increased from 0 to a maximum frequency change range for a predetermined time using the determined frequency change range as the maximum frequency change range or decreased from the maximum frequency change range to 0 for a predetermined time, as described above with reference to FIGS. 4 and 5.

Figure 7:
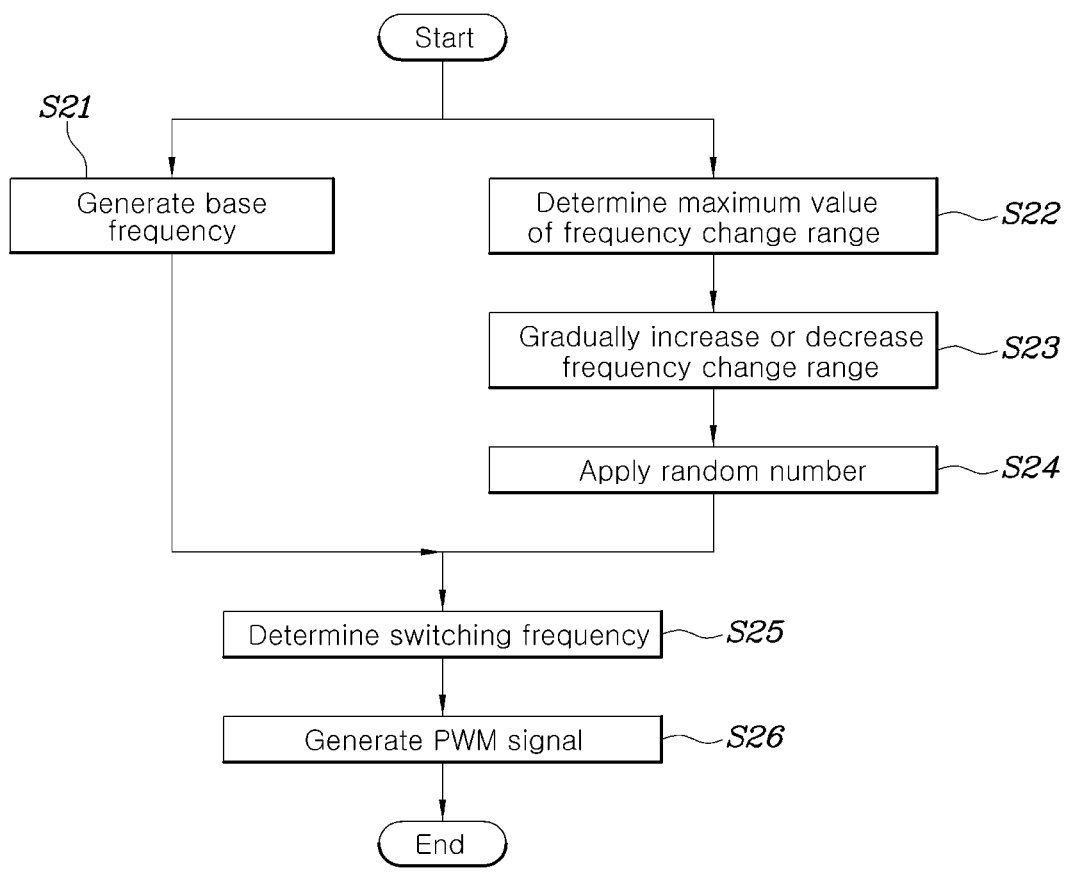
FIG. 7 is a flowchart of a method for controlling an inverter for driving a motor according to another embodiment of the present disclosure.

A method of controlling an inverter according to another embodiment of the present disclosure is illustrated in FIG. 7.

FIG. 7 is a flowchart showing a method of controlling an inverter according to another embodiment of the present disclosure.

Referring to FIG. 7, the method of controlling an inverter for driving a motor according to another embodiment of the present disclosure may start with step S21 in which the base frequency generator 65 generates a base frequency $F_{base}$ for switching the inverter 30 and step S22 in which the random band generator 61 receives motor driving information and determines a frequency change range $F_{rand}$. Steps S21 and S22 may be substantially the same as the steps S11 and S12 shown in FIG. 6.

In step S21 of generating the base frequency $F_{base}$, the base frequency may be generated using a method applied to pulse width modulation using a fixed switching frequency other than random pulse width modulation. In step S22, the random band generator 61 may generate a cost value using all of a plurality of pieces of motor driving information as variables and then determine a frequency change range $F_{rand}$ corresponding to the cost value using a data map or generate cost values with respect to a plurality of pieces of motor driving information and determine a frequency change range $F_{rand}$ on the basis of a maximum value among a plurality of pieces of cost values, as described above with reference to FIGS. 4 and 5. However, in another embodiment of the present disclosure, the frequency change range $F_{rand}$ determined in step S22 is not immediately applied and a frequency change range is gradually increased from 0 to the frequency change range $F_{rand}$ determined in step S22 and applied when the random pulse width modulation method is started.

That is, in subsequent step S23, the random band generator 61 sets the frequency change range $F_{rand}$ determined in step S22 to a maximum change range and continuously gradually increases a frequency change range from 0 to the maximum change range for a preset time from a time at which random pulse width modulation starts or continuously gradually decreases the frequency change range from the maximum change range to 0 for a preset time from a time at which random pulse width modulation ends.

Figure 8A:
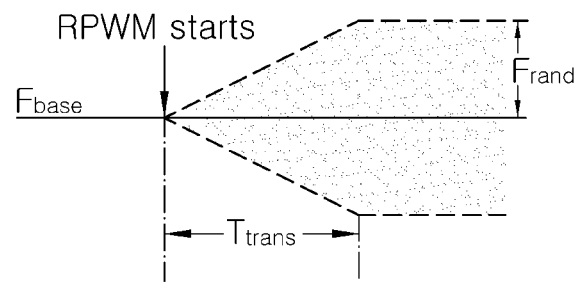
FIGS. 8A and 8B are diagrams showing ranges of changes of the frequency of a pulse width modulation signal when random pulse width modulation is started and stopped by the method for controlling an inverter for driving a motor according to another embodiment of the present disclosure, respectively.
Figure 8B:
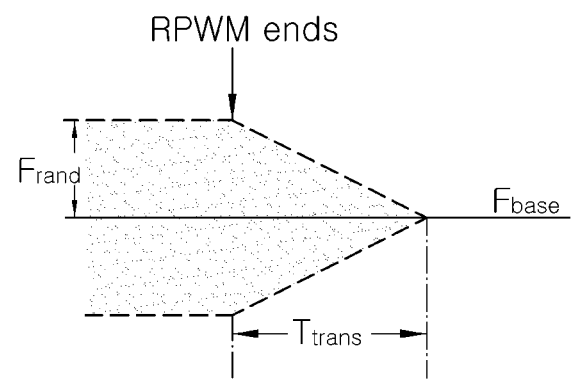

FIGS. 8A and 8B are diagrams showing ranges of changes of the frequency of a pulse width modulation signal when random pulse width modulation is started and stopped by the method for controlling an inverter for driving a motor according to another embodiment of the present disclosure. Particularly, FIG. 8A shows a case in which random pulse width modulation is started and FIG. 8B shows a case in which random pulse width modulation is stopped.

Referring to FIG. 8A, when random pulse width modulation is started, the random band generator 61 continuously and gradually increases a frequency change range from 0 to the maximum change range $F_{rand}$ determined in step S22 for a preset time $T_{trans}$ from the time at which random pulse width modulation starts.

Referring to FIG. 8B, when random pulse width modulation ends, the random band generator 61 continuously and gradually decreases the frequency change range from the maximum change range $F_{rand}$ determined in step S22 to 0 for the preset time $T_{trans}$ from the time at which random pulse width modulation ends.

In another embodiment of the present disclosure, rapid change in the frequency of the pulse width modulation signal can be prevented when switching between the random pulse width modulation method and another modulation method is performed to prevent deterioration of current controllability through step S23.

Further, the random generator 63 may generate a random number $K_{rand}$ having a random value in the range of −1 to 1 in parallel with steps S21, S22 and S23, and a frequency change value may be determined by multiplying the frequency change range $F_{rand}$ (gradually increasing or decreasing) determined in step S23 by the random number $K_{rand}$.

Subsequently, the adder 67 determines a switching frequency $F_{sw}$ of a pulse width modulation signal for controlling the inverter 30 by adding the frequency change value to the base frequency $F_{base}$ and provides the switching frequency $F_{sw}$ to the voltage modulator 123 (S25).

Then, the voltage modulator 123 receives a voltage command $V_{dqss}$Ref and the switching frequency $F_{sw}$ (or carrier frequency) generated in the adder 67 and generates a pulse width modulation signal for determining on/off states of the switching elements in the inverter 30 on the basis of the voltage command $V_{dqss}$Ref and the switching frequency $F_{sw}$ (S26). As described above, the voltage modulator 123 may generate a carrier signal in the form of triangular waves corresponding to the switching frequency $F_{sw}$ (or carrier frequency) generated in the adder 67 and generate a pulse width modulation signal in the form of square waves by comparing the carrier signal with the d/q axis voltage command $V_{dqss}$Ref in step S26.

The pulse width modulation signal generated in the voltage modulator 123 may be provided to the gates of the switching elements S1 to S6 in the inverter 30 to control on/off states of the switching elements S1 to S6.

Particularly, the method of changing a range of changes in the frequency of the pulse width modulation signal in random pulse width modulation can obtain superior effects in a procedure of switching random pulse width modulation to a 6-step control method using 12-sample phase control in which a base frequency is synchronized with a motor speed during application of random pulse width modulation.

Figure 9:
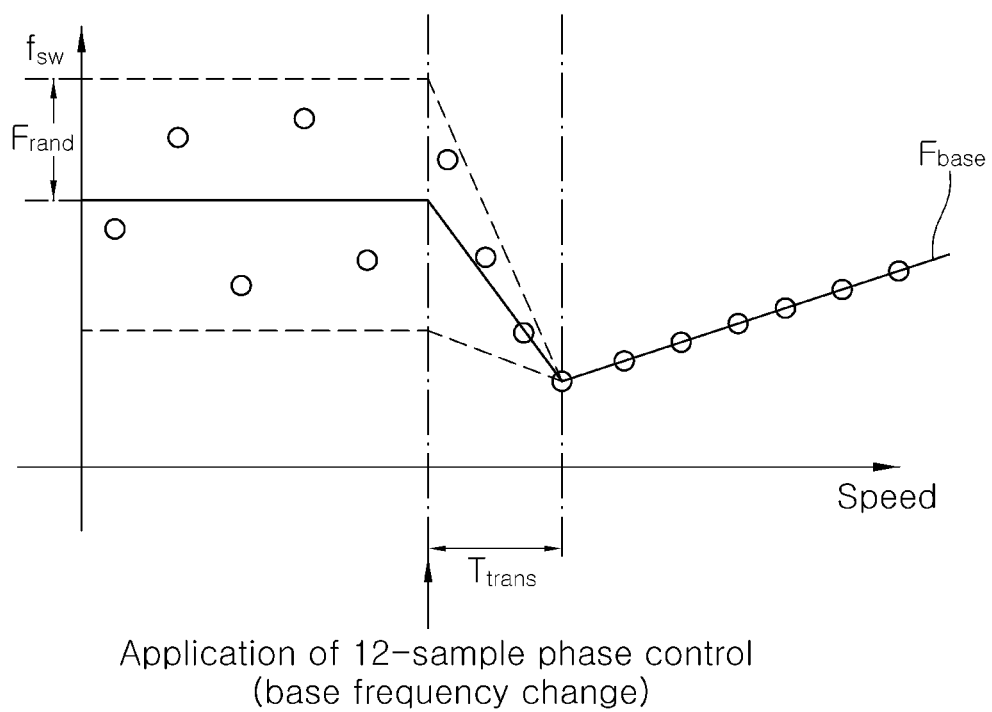
FIG. 9 is a diagram showing switching frequency variation when switching between the random pulse width modulation method and a 6-step control method using 12-sample phase control is performed according to the method for controlling an inverter for driving a motor according to another embodiment of the present disclosure.

FIG. 9 is a diagram showing switching frequency variation when switching from the random pulse width modulation method to the 6-step control method using 12-sample phase control is performed according to the method for controlling an inverter for driving a motor according to another embodiment of the present disclosure.

As shown in FIG. 9, when switching from the random pulse width modulation method to the 6-step control method using 12-sample phase control is requested during application of the random pulse width modulation method in which a pulse width modulation signal is determined to have an arbitrary frequency within a maximum change range determined by the random access generator 61, the random band generator 61 continuously and gradually decreases a frequency change range from the maximum change range Franc to 0 for a preset time $T_{trans}$ from the time at which switching is requested. Here, the base frequency $F_{base}$ switches to a switching frequency determined by the 6-step control method using 12-sample phase control which performs a switching operation in synchronization with speed. In another embodiment of the present disclosure, it is possible to prevent the switching frequency from abruptly changing by gradually decreasing a random frequency change range for the time $T_{trans}$ to determine the switching frequency of pulse width modulation and to prevent deterioration of current controllability when control of asynchronous switching frequency operation (RPWM) switches to synchronous switching (12-sample phase control). In FIG. 9, small circles refer to points at which a switching frequency is determined.

According to another embodiment of the present disclosure, when a fault is generated in a motor system including a motor or an inverter or a fault is canceled, it is possible to directly change a frequency change range to a maximum change range or 0 at a certain time instead of continuously and gradually changing the frequency change range as described above.

Figure 10:
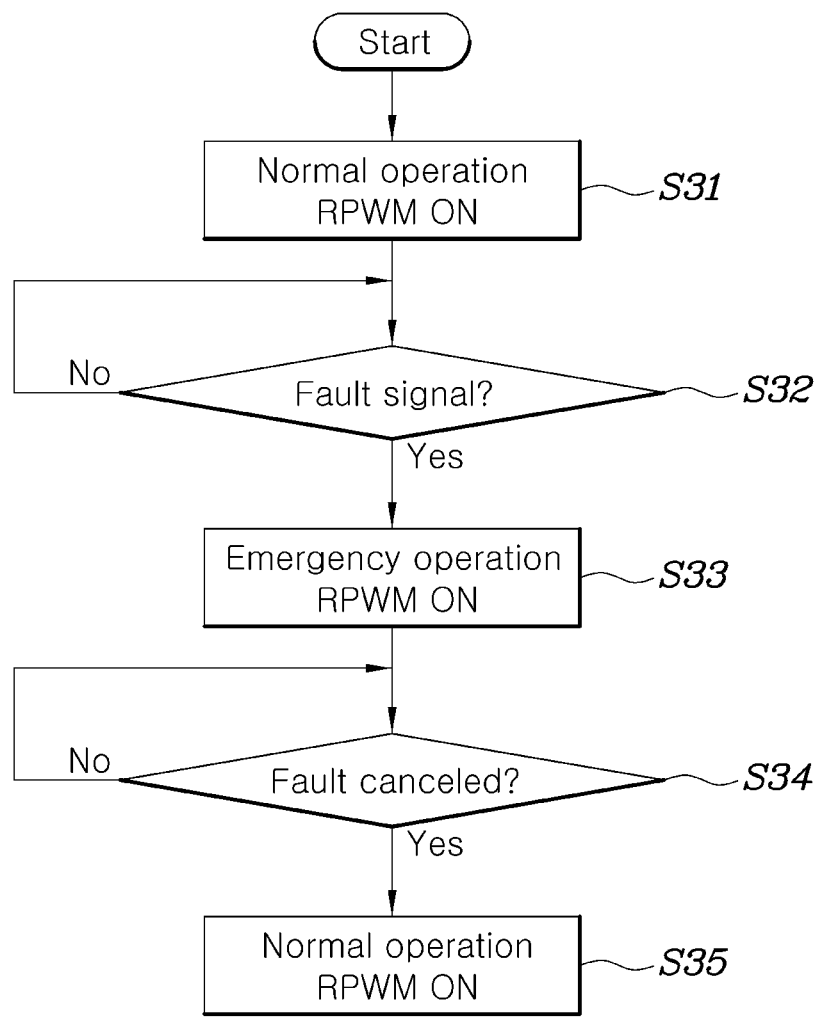
FIG. 10 is a flowchart showing a method for setting a frequency change range when a fault is generated in a motor system according to another embodiment of the present disclosure.
Figure 11A:
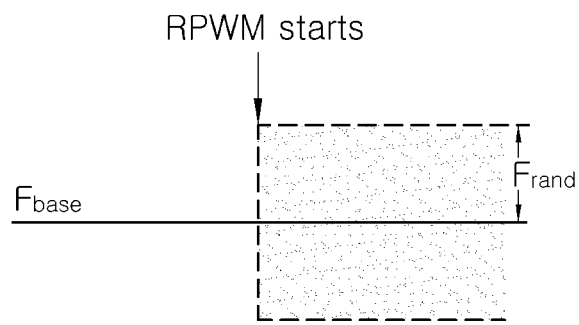
FIGS. 11A and 11B are diagrams showing frequency change ranges according to the method for setting a frequency change range when a fault is generated in a motor system shown in FIG. 10, more especially.
Figure 11B:
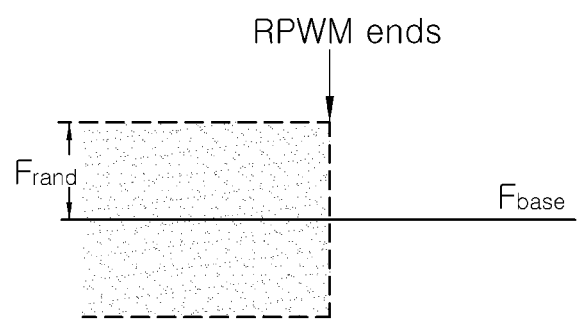

FIG. 10 is a flowchart showing a method for setting a frequency change range when a fault is generated in a motor system according to another embodiment of the present disclosure. FIGS. 11A and 11B are diagrams showing frequency change ranges according to the method for setting a frequency change range when a fault is generated in a motor system shown in FIG. 10. Here, FIG. 11A shows a case in which a frequency change range is set to a maximum change range when a fault is canceled, and FIG. 11B shows a case in which the frequency change range is set to 0 when a fault is generated.

When the motor system is normally operated, the inverter may be controlled with a switching frequency randomly determined within a frequency change range Franc determined by the random band generator 61, as described above with reference to FIG. 4 or 5 (S31).

When the motor system is determined to have a fault and thus a fault signal is generated in a controller or the like (S32), the random band generator 61 may immediately set the frequency change range $F_{rand}$ to 0 at the time when the fault signal is generated, as shown in FIG. 11B, to stop random pulse width modulation and perform an emergency operation of controlling the inverter with the base frequency $F_{base}$ (S33).

Subsequently, when the situation in which the fault is generated ends during the emergency operation and thus a fault cancellation signal is generated by the controller or the like (S34), the random band generator 61 may immediately determine the frequency change range $F_{rand}$ as described above with reference to FIG. 4 or 5 at the time when the fault cancellation signal is generated or set the frequency change range to a frequency change range $F_{rand}$ before the fault is generated, as shown in FIG. 11A, to resume random pulse width modulation (S33).

As described above, when a motor system has a fault or a fault state is canceled, another embodiment of the present disclosure can rapidly cope with the fault by setting a frequency change range to 0 or a maximum change range at the time when the fault is generated or the fault is canceled.

Although the present disclosure has been described with reference to the exemplary embodiments, those skilled in the art will appreciate that various modifications and variations can be made in the present disclosure without departing from the spirit or scope of the disclosure.

What is claimed is:

1. An apparatus for controlling an inverter for driving a motor, the apparatus comprising a processor which includes:
    a current processor for generating a voltage command for causing a current detection value obtained by measuring a current supplied from the inverter to the motor to follow a current command for driving the motor;
    a voltage modulator for generating a pulse width modulation signal for controlling on and off states of switching elements in the inverter with a switching frequency based on the voltage command; and
    a frequency determining processor for setting a frequency change range which is a range within which the switching frequency is randomly changed, and for randomly determining the switching frequency within the frequency change range when a random pulse width modulation method is applied to control of the inverter,
    wherein the frequency determining processor gradually increases the frequency change range when starting application of the random pulse width modulation method and gradually decreases the frequency change range when stopping application of the random pulse width modulation method.

2. The apparatus according to claim 1, wherein the frequency determining processor gradually increases or decreases the frequency change range when the random pulse width modulation method and a different modulation method applied to control of the inverter are switched.

3. The apparatus according to claim 1, wherein the frequency determining processor sets a maximum value of the frequency change range, gradually changes the frequency change range from the maximum value to 0 (zero) when the random pulse width modulation method is switched to a modulation method different from the random pulse width modulation method while the inverter is controlled according to the random pulse width modulation method, and gradually changes the frequency change range from 0 (zero) to the maximum value when the modulation method different from the random pulse width modulation method is switched to the random pulse width modulation method while the inverter is controlled according to the modulation method different from the random pulse width modulation method.

4. The apparatus according to claim 1, wherein the frequency determining processor directly changes the frequency change range to 0 (zero) to start an emergency operation when a fault signal is generated while the inverter is controlled according to the random pulse width modulation method and directly changes the frequency change range from 0 (zero) to a frequency change range before generation of the fault when a fault cancellation signal is generated during the emergency operation.

5. The apparatus according to claim 1, wherein the frequency determining processor comprises:
    a random band generator for determining the frequency change range;
    a random number generator for randomly determining a constant within a preset range;
    a base frequency generator for generating a base frequency which is a base for determining the switching frequency; and
    an adder for adding values obtained by multiplying the base frequency by the frequency change range determined by the random band generator and the constant generated by the random number generator to determine the switching frequency,
    wherein the random band generator sets a maximum value of the frequency change range and applies the random pulse width modulation method or stops the application of the random pulse width modulation method by gradually increasing or decreasing the frequency change range from the maximum value of the frequency change range to 0 (zero) or from 0 (zero) to the maximum value.

6. The apparatus according to claim 5, wherein the random band generator gradually changes the frequency change range from the maximum value to 0 (zero) when the random pulse width modulation method is switched to a modulation method different from the random pulse width modulation method while the inverter is controlled according to the random pulse width modulation method, and gradually changes the frequency change range from 0 (zero) to the maximum value when the modulation method different from the random pulse width modulation method is switched to the random pulse width modulation method while the inverter is controlled according to the modulation method different from the random pulse width modulation method.

7. The apparatus according to claim 1, wherein the frequency determining processor sets a maximum value of the frequency change range based on motor driving information including the current command, the current detection value, a temperature of the inverter, a temperature of the motor, and a speed of the motor.

8. The apparatus according to claim 5, wherein the random band generator randomly determines a constant in a range of −1 to 1.

9. The apparatus according to claim 1, wherein the voltage modulator generates a carrier signal in triangular waves having a frequency corresponding to the switching frequency and compares the voltage command with the carrier signal to generate the pulse width modulation signal in square waves.

10. A method for controlling an inverter for driving a motor through a random pulse width modulation method for randomly changing a frequency of a pulse width modulation signal, the method comprising steps of:
    generating, by a processor, a base frequency which is a base for determining a switching frequency of the pulse width modulation signal for controlling switching of switching elements in the inverter;
    setting, by the processor, a frequency change range for changing the switching frequency, wherein the frequency change range is set to be gradually increased when application of the random pulse width modulation method has been started and the frequency change range is set to be gradually decreased when application of the random pulse width modulation method has been stopped;
    randomly determining, by the processor, a constant within preset range; and determining, by the processor, the switching frequency by adding values obtained by multiplying the base frequency by the frequency change range and the constant.

11. The method according to claim 10, wherein the step of setting the frequency change range and gradually increasing or decreasing the frequency change range comprises steps of:
   determining a maximum value of the frequency change range for changing the switching frequency; and
   gradually increasing the frequency change range from 0 (zero) to the maximum value or gradually decreasing the frequency change range from the maximum value to 0 (zero) according to whether application of the random pulse width modulation method has been started or stopped.

12. The method according to claim 11, wherein the step of decreasing comprises steps of:
   gradually changing the frequency change range from the maximum value to 0 (zero) when the random pulse width modulation method is switched to a modulation method different from the random pulse width modulation method while the inverter is controlled according to the random pulse width modulation method; and
   gradually changing the frequency change range from 0 (zero) to the maximum value when the modulation method different from the random pulse width modulation method is switched to the random pulse width modulation method while the inverter is controlled according to the modulation method different from the random pulse width modulation method.

13. The method according to claim 11, wherein the maximum value is determined based on motor driving information including a current command, a current detection value, a temperature of the inverter, a temperature of the motor, and a speed of the motor.

14. The method according to claim 10, further comprising steps of:
   directly changing the frequency change range to 0 (zero) to start an emergency operation when a fault signal is generated while the inverter is controlled according to the random pulse width modulation method; and
   directly changing the frequency change range from 0 (zero) to a frequency change range before generation of the fault when a fault cancellation signal is generated during the emergency operation.

15. The method according to claim 10, further comprising steps of:
   generating a carrier signal in triangular waves having a frequency corresponding to the switching frequency determined in the step of determining the switching frequency; and
   comparing the carrier signal with a voltage command determined to cause a current detection value obtained by measuring a current supplied from the inverter to the motor to follow a current command to generate the pulse width modulation signal in square waves.

16. The method according to claim 10, wherein the step of determining the constant comprises randomly determining the constant within a range of −1 to 1.

* * * * *